(No Model.) 7 Sheets—Sheet 1.

J. NUTT.
MACHINE FOR BENDING HAT WIRES.

No. 376,608. Patented Jan. 17, 1888.

Witnesses,
J. H. Shumway.
Fred C. Earle

Jos. Nutt, Inventor,
By atty
John C. Earle (No Model.) 7 Sheets—Sheet 3.
J. NUTT.
MACHINE FOR BENDING HAT WIRES.
No. 376,608. Patented Jan. 17, 1888.

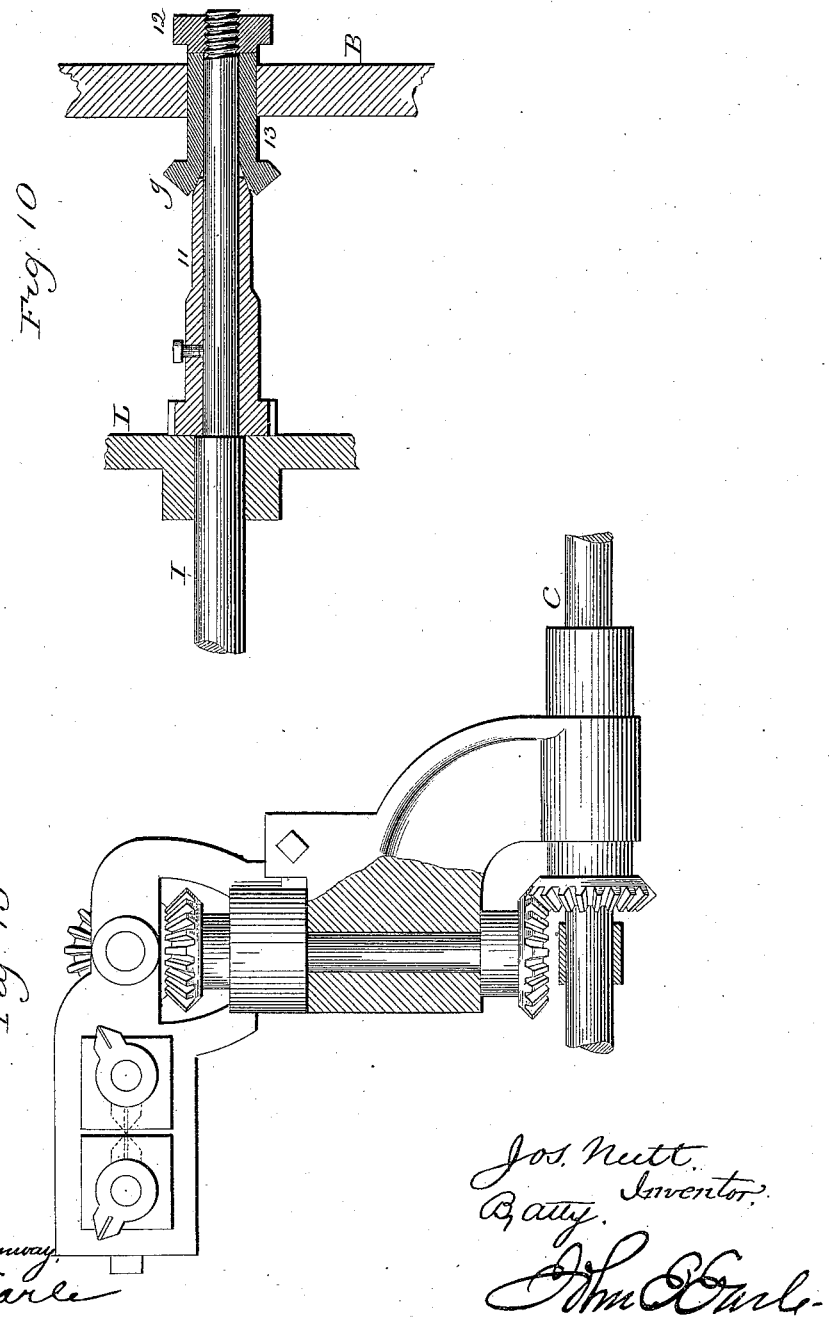

(No Model.) 7 Sheets—Sheet 5.
J. NUTT.
MACHINE FOR BENDING HAT WIRES.
No. 376,608. Patented Jan. 17, 1888.
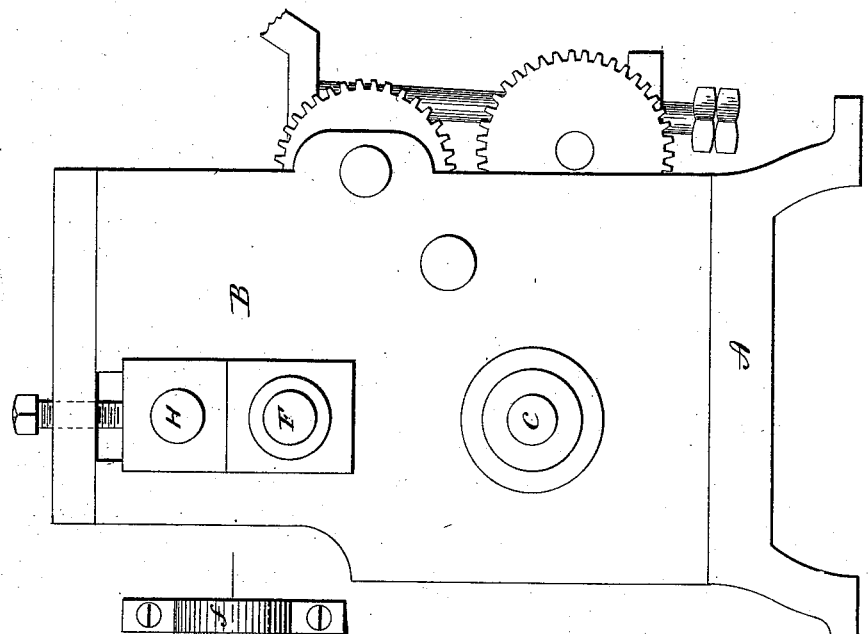
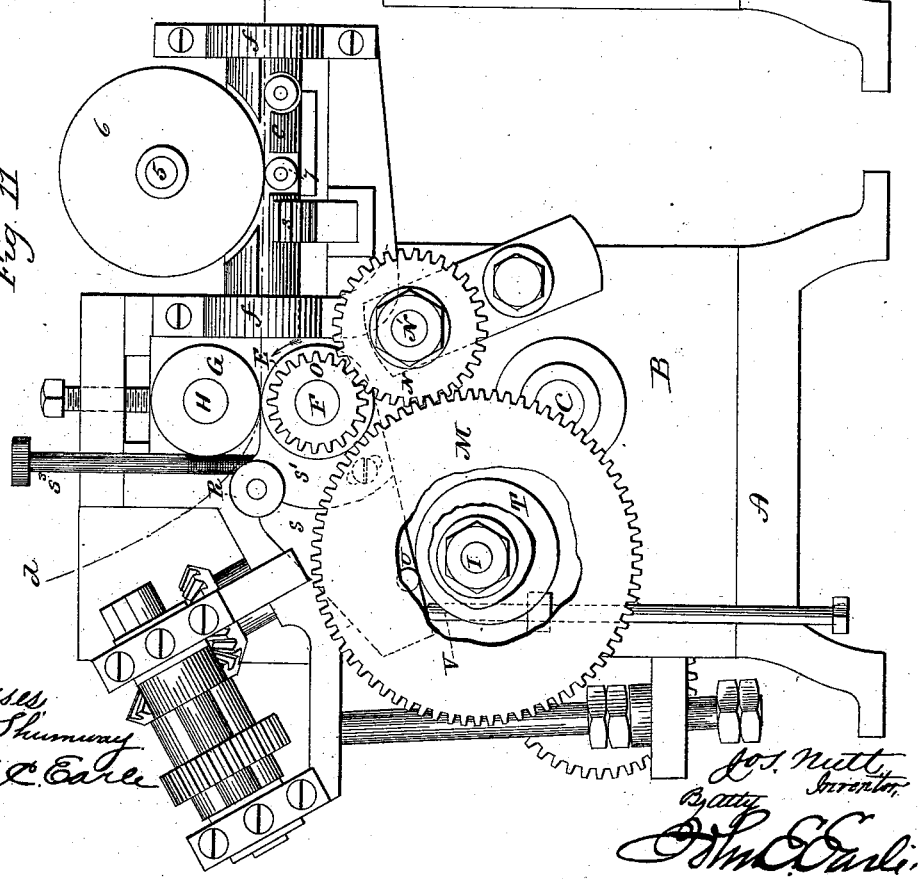

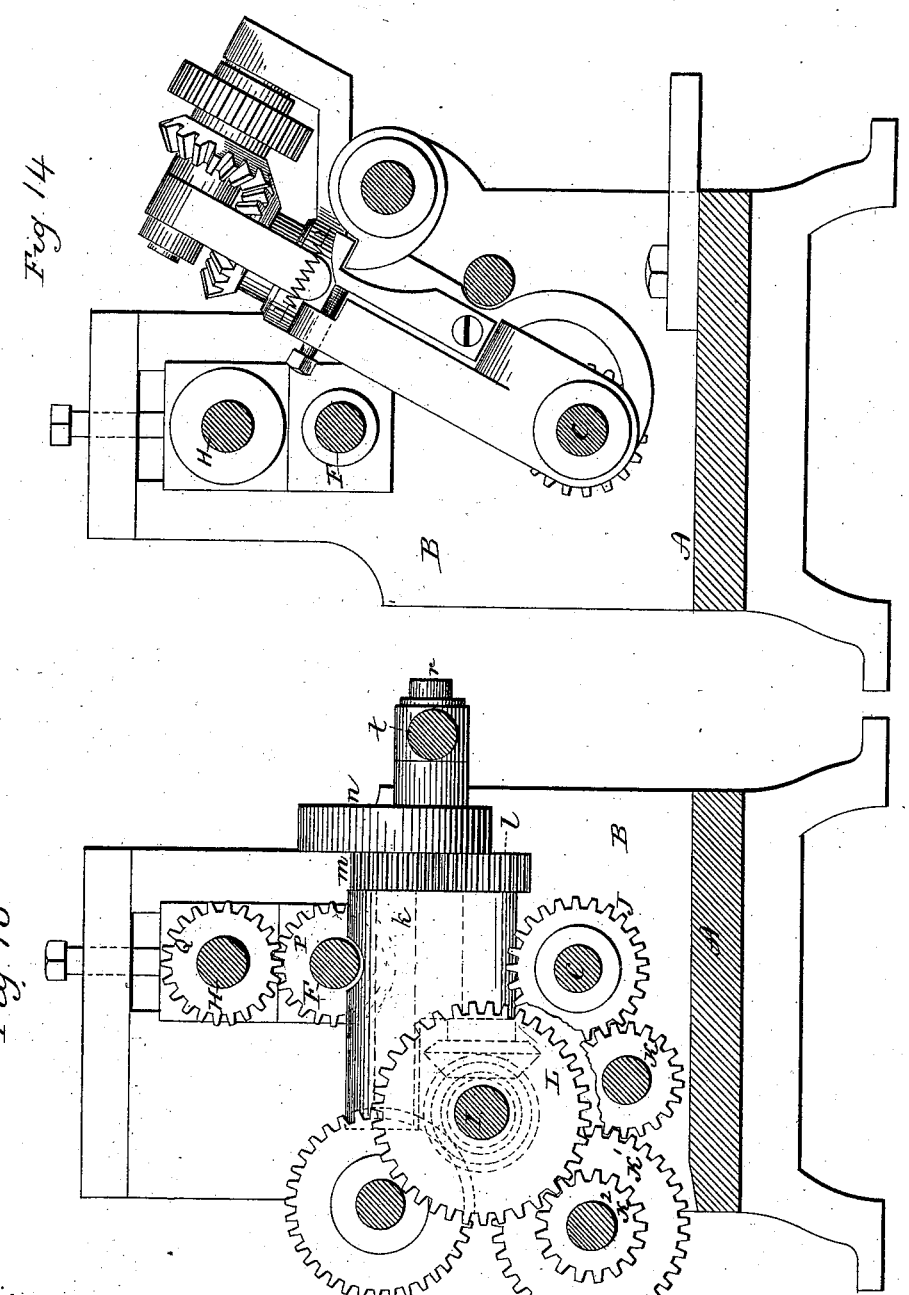

(No Model.) 7 Sheets—Sheet 7.
J. NUTT.
MACHINE FOR BENDING HAT WIRES.
No. 376,608. Patented Jan. 17, 1888.
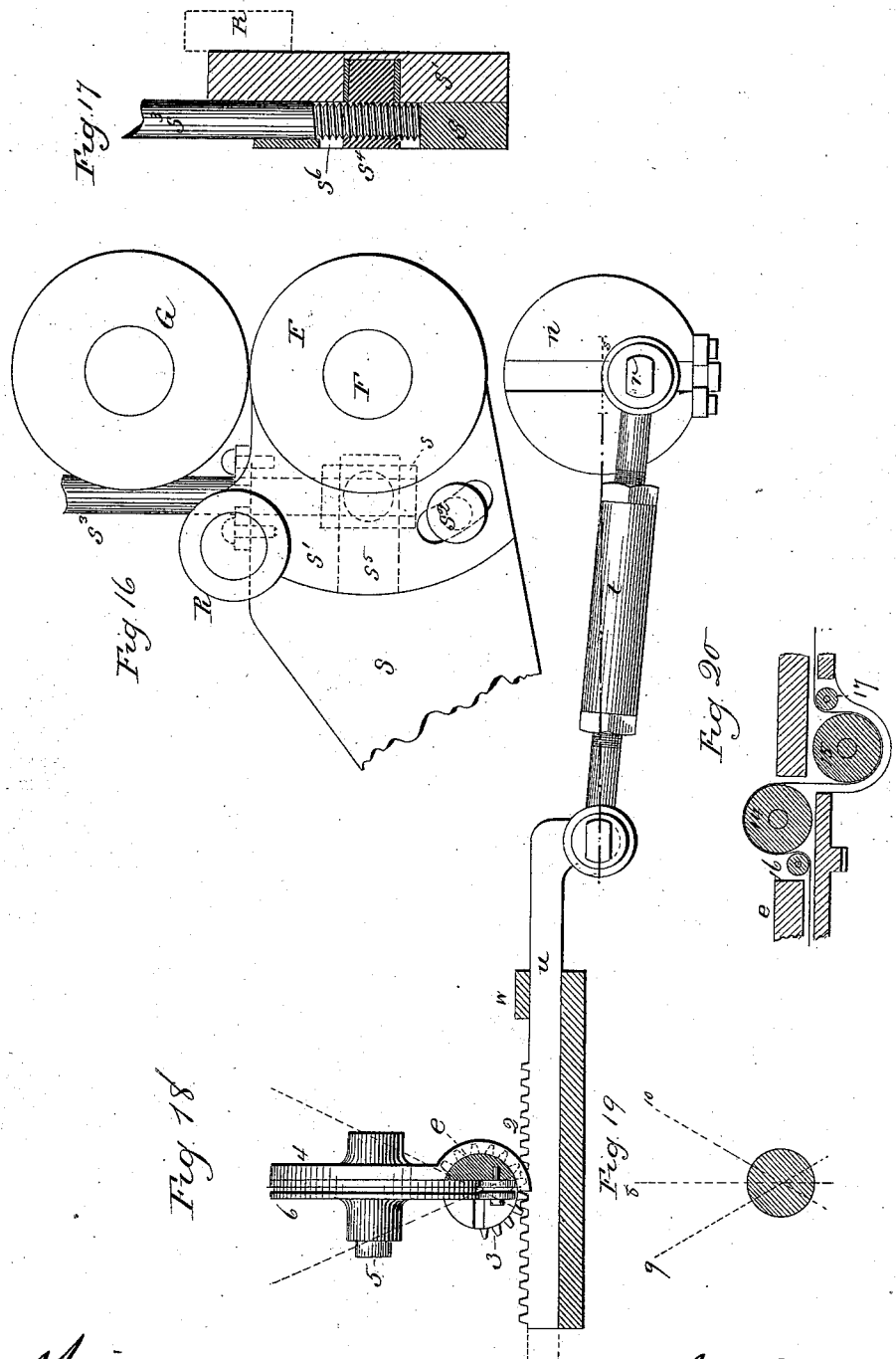

UNITED STATES PATENT OFFICE.

JOSEPH NUTT, OF DANBURY, CONNECTICUT.

MACHINE FOR BENDING HAT-WIRES.

SPECIFICATION forming part of Letters Patent No. 376,608, dated January 17, 1888.

Application filed September 12, 1887. Serial No. 249,423. (No model.)

*To all whom it may concern:*

Be it known that I, JOSEPH NUTT, of Danbury, in the county of Fairfield and State of Connecticut, have invented a new Improvement in Machines for Bending Hat-Wires; and I do hereby declare the following, when taken in connection with accompanying drawings and the letters of reference marked thereon, to be a full, clear, and exact description of the same, and which said drawings constitute part of this specification, and represent, in—

Figure 1:
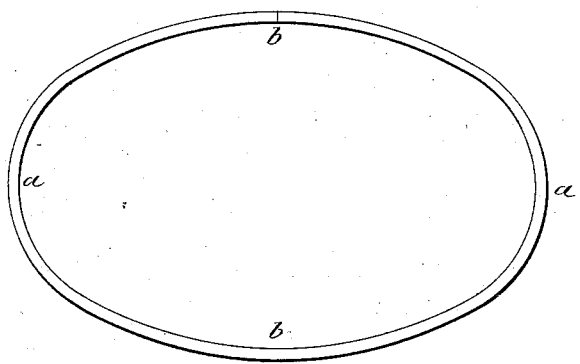
Figure 2:
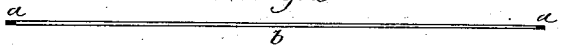
Figure 3:
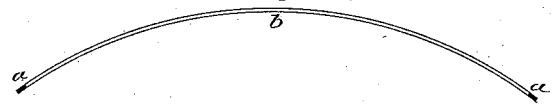
Figure 4:
Figure 5:
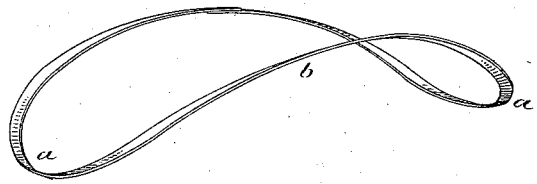
Figure 6:
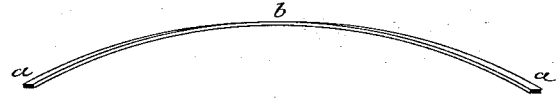
Figure 7:
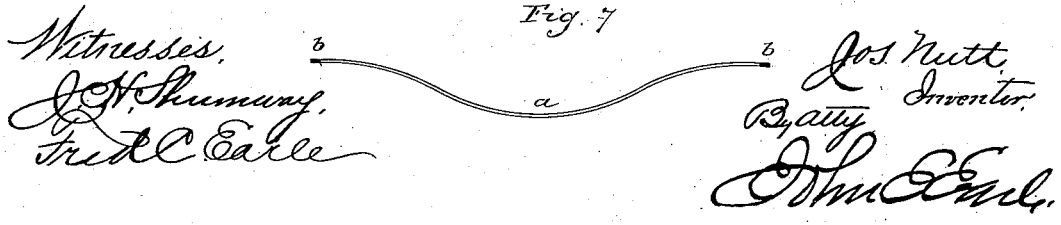
Figure 8:
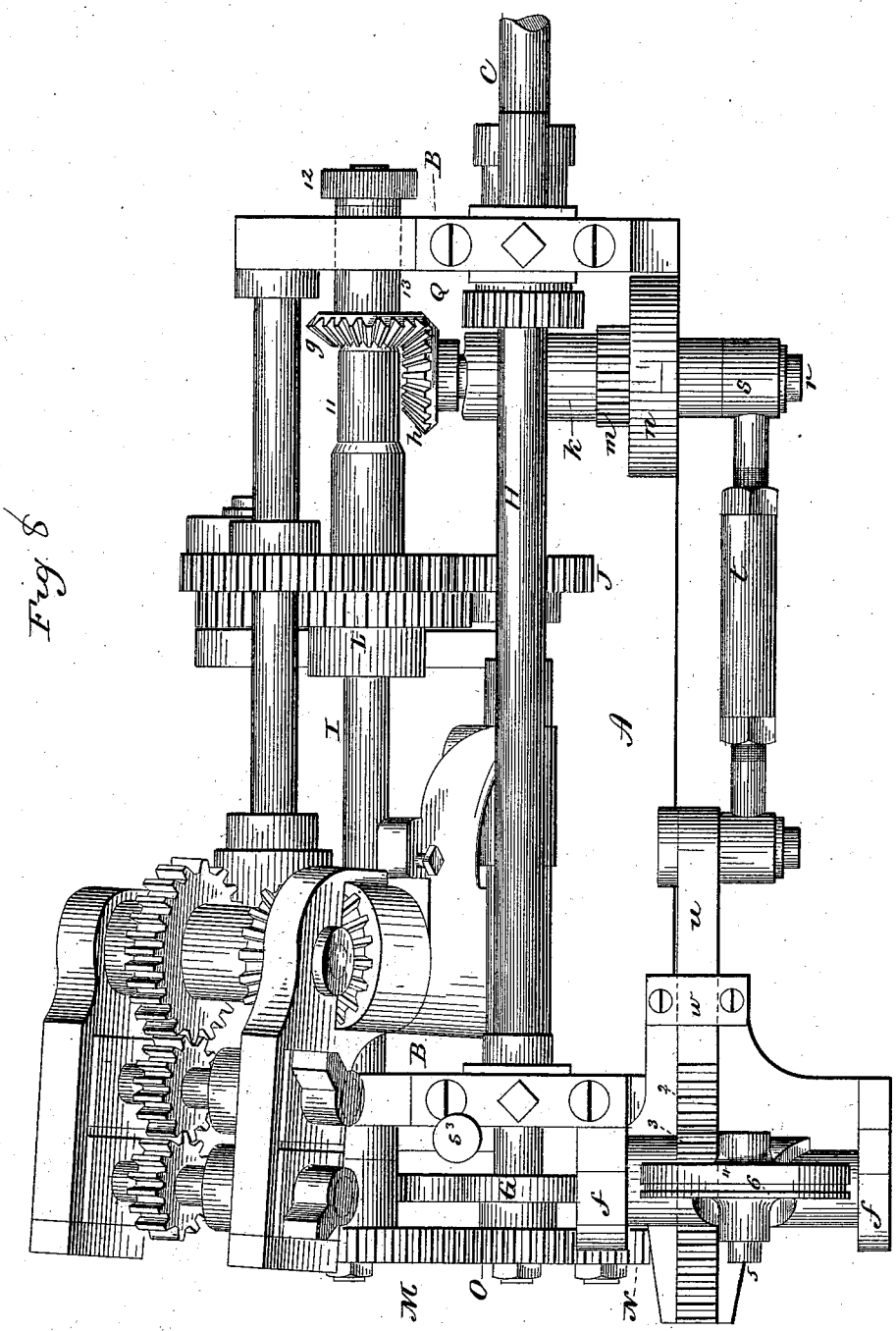
Figure 9:
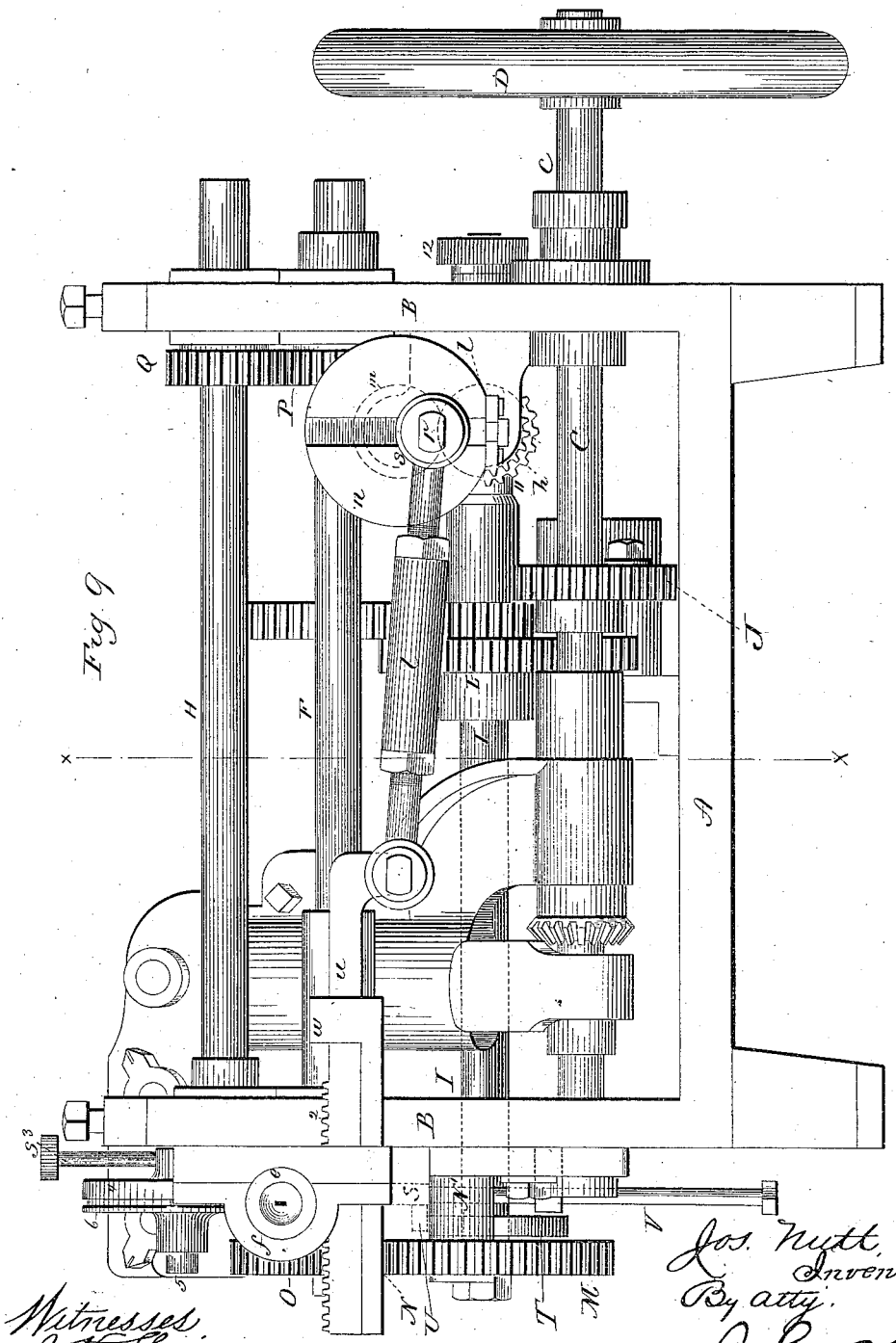

Figure 1, a plain flat elliptical wire frame; Fig. 2, a section cutting through on the longest diameter; Fig. 3, the same as Fig. 2, but bent from the horizontal plane to give the dip at the front and rear; Fig. 4, a transverse section cutting at right angles to Fig. 3 and showing the dip; Fig. 5, a perspective view of our improved frame; Fig. 6, a section of the same cutting through the longest diameter—that is, centrally from front to rear; Fig. 7, a transverse section on the shortest diameter—that is, cutting through the center from side to side; Fig. 8, a top or plan view of the machine; Fig. 9, a frontside view; Fig. 10, a detached longitudinal section, illustrating the device for adjusting the pinion from which the oscillating feed derives its movement; Fig. 11, a left-hand end view; Fig. 12, a right-hand end view; Fig. 13, a vertical transverse section cutting through line $x$ $x$ of Fig. 9 and looking to the right; Fig. 14, a vertical transverse section on same line looking to the left; Fig. 15, a sectional front view of the frame carrying the revolving cutters; Fig. 16, a detached view of the rolls E, G, and R, with the lever S enlarged; Fig. 17, a vertical section through the two parts of the lever, illustrating the means of adjusting the roll R; Fig. 18, a transverse section through the guide $e$, illustrating its means of oscillation and showing the relation of the wheel 6 thereto; Fig. 19, a diagram illustrating the action of the oscillating wire-guide; Fig. 20 a modification.

This invention relates to an improvement in machines adapted to automatically shape the wire springs or frames such as are introduced into the brims of hats to give stiffness to the brim and maintain the required droop at the front and rear. These frames must have an outline corresponding to the periphery of the brim. In some cases this is a complete circle; in others the shape is elliptical—that is to say, narrower from side to side than from front to rear; and as it is necessary that the brim shall droop or dip at the front and rear, a corresponding curve from the flat plane must be given to the spring or frame, in order that the frame may aid in retaining the shape of the brim. These frames are usually made from tempered steel wire and require treatment to give them the requisite compound curved shape. In some cases the wires are round or cylindrical; in others they are flat. When made of flat wire, it is desirable that the plane of the wire shall be in substantially the plane of the brim, so as to present the edge of the wire to the edge of the brim in order to give its firmest support in the radial direction. If the wire be simply bent edgewise into a hoop shape, as seen in Fig. 1, and so that the wire lies in a horizontal plane, as seen in Fig. 2, the hoop has the outline of the brim in a horizontal plane, but without the dip required at the front and rear. If this flat hoop be bent to give the required dip, as seen in Fig. 3, the wire will lie in a flat plane at the sides, as seen in Fig. 4, but from the center sides will gradually incline downward, as seen at the extreme ends, Fig. 3, and because of the twist which such a bend gives to the wire it loses a large portion of its strength radially—that is, to resist the force from the outside.

In Letters Patent of the United States No. 299,278, the invention of myself and another, we described a machine which would automatically bend the wire into hoop shape, and at the same time give to it a curvature to produce the dip at the front and rear without twisting. A frame of this character is illustrated in Fig. 5 as made from flat wire bent edgewise into hoop shape, elliptical or round, as the case may be, and curved to give the dip, but so as to retain the wire flat in a horizontal plane at all points around the frame.

$a$ $a$, Fig. 6, represent the extreme centers at the front and rear, and $b$ $b$ represent the centers at opposite sides. The frame is made with downward curves from the center of its sides toward the front and rear, and it will be observed that every portion of the frame is horizontal, from the inside to its outside, as indicated in Figs. 6 and 7; hence the frame presents its edge directly outward in its strongest shape.

My present invention is an improvement upon the machine described in the said patent. In that patent the curvature to give the required dip to the front and rear was produced upon the wire after the lateral curve had been given to it to produce the hoop shape.

The object of my present invention is to impart the curve to give the dip at the front and rear by oscillating the wire in its passage through the rollers, which give to it the hoop shape, and whereby the machine is adapted for making frames from either flat, round, or angular wire.

To the full understanding of my present invention, it is necessary to illustrate the entire machine and to fully describe its operation; and in describing the machine I will first do so in its adaptation to forming the frames from flat wire.

A is the bed of the machine, upon which stand uprights B B, these uprights supporting the various shafts.

C is the principal or driving shaft, to which power is applied. It may be by hand, through a crank-wheel, D, or through a pulley driven by means of a belt, in the usual manner of communicating power to machines.

E is the principal or first roll, arranged upon the shaft F and outside the upright at one end of the machine; G, the second roll, arranged upon the shaft H, these shafts being parallel with each other. One of the rolls—preferably E—has an annular groove in its periphery corresponding in width to the thickness of the wire and less in depth than the width of the wire. Both rolls may be correspondingly grooved, but one is sufficient.

I is an intermediate shaft, to which rotation is communicated from the driving-shaft C by a gear, J, on said shaft C, through a pinion, K, and intermediate gears, K' and K², the latter working into a gear, L, on the shaft I. This shaft I extends through the upright at the roll end of the machine, and is there fitted with a gear, M, working into a gear, N, which in its turn works into a pinion, O, on the shaft F, which carries the roll E, and so as to turn the roll in the direction indicated by the arrow, Fig. 11. A like rotation is communicated to the shaft of the second roll, G, by a gear, P, on the shaft F, working into a corresponding gear, Q, on the shaft H.

R is the third roll, which is hung upon a lever, S, the said lever is hung loosely upon the shaft F. The roll R is in such position with relation to the rolls E and G that the wire introduced between the rolls E and G turns upward to pass the roll R, as indicated by broken line d, Fig. 11, the said line indicating the wire. By this relative position of the roll R the curve is given to the wire to produce the hoop shape. If that roll be stationary, then the hoop shape will be a circle. That circle may be increased or diminished by setting the roll R at a greater or less distance from the roll G—an adjustment common in bending apparatus; but this adjustment is best produced as hereinafter described.

To produce an elliptical shape, the roll R must change its relative position to the roll G during the process of bending the hoop or frame. To give this requisite movement to the roll R, an eccentric, T, is arranged on the shaft I. The speed of the machine is such that the shaft I makes two full rotations for each frame. The gears M N O are therefore adjusted so that the feed-rolls will take in the requisite length of wire for a single frame during the two revolutions of the shaft I. To permit such adjustment of the gears, the gear N is hung upon an adjustable stud, N', as seen in Figs. 9 and 11. This adjustment of gearing is too well known in other machines to require particular description in this specification.

From the lever S a stud, U, projects over the eccentric T, and so as to bear upon the eccentric throughout its whole or partial rotation. If the lever ride upon the eccentric throughout its entire revolution, then the roll R will receive its extreme advance and receding movement toward and from the roll G, and consequently will produce the greatest extent of ellipse—that is to say, starting from the end of the wire which is to be at the center of one side of the frame, the roll R will gradually advance toward the roll G until the extreme throw of the eccentric is attained, which will be at the center front or one-fourth the circumference of the frame. Then from that point the roll R will recede until the opposite point of the eccentric is reached, which will be the side center of the frame. Then the roll R will again gradually advance toward the roll G, as before, until the center rear of the frame is reached, and then recede until the opposite end is reached. Thus the radius of the curves will decrease from the point of starting to the center front, thence increase to the center side, again decrease to the center rear, and then increase to the end, thus producing an elliptical shape, and this elliptical shape may be varied by applying eccentrics of greater or less eccentricity in place of the eccentric T; or, which answers the same purpose, the lever S may be adjustable vertically, so as to take it out of reach of the eccentric during a part of its revolution, but come within it during the remainder. The operation of the eccentric while bearing upon the roll will occur on the shorter bends—that is, at the front and rear of the frame—and this adjustment is made by means of a set-screw, V, on the side of the upright, so that the lever S will strike the screw, as seen in Fig. 11, before the shorter diameter of the eccentric is reached, and from that point the eccentric will continue its revolution without action upon the lever; but so soon as the periphery of the eccentric comes in contact with the stud U, then the lever will rise, as before, to the extreme throw of the eccentric and return until it reaches the stop V.

To increase or decrease the size of the frame, as before stated, the roll R is made adjustable toward or from the roll G. This is best done by making the lever S in two parts, S S', (see Figs. 16 and 17,) the two parts being hung loosely upon the same shaft, F, and so as to swing in parallel planes, the part S' being represented as in front of the part S, and the roll R is hung directly to the part S', and so that the part S', with the roll R, may be adjusted upon its axis independent of the part S, yet the two parts may be bound together by a set-screw, S², through a slot in the part S' into the part S, the slot permitting the part S' to be adjusted, but the screw securing the two parts together as one. In the part S a vertical adjusting-screw, S³, is arranged, which extends upward to a convenient point, as seen in Fig. 11, where it may be readily turned. This screw S³ works through a nut, S⁴, which sets into a radial recess, S⁵, in the part S', and the part S is constructed with a vertical recess, S⁶, so that the nut is permitted a vertical movement in the part S, the screw taking a bearing upon the bottom of the recess S⁶, as seen in Fig. 17, so as to prevent its axial movement, but leave it free for rotation. If then the screw S³ be turned in one direction, it will permit the part S' of the lever to drop and adjust the roll R accordingly, or, turned in the opposite direction, it will raise the part S' of the lever and the roll R accordingly, and when the adjustment is attained the set-screw S² is applied to bind the two parts together. It will be apparent that while the frame thus bent will attain the required shape for the circumference of the brim, it will be in the same plane throughout, as in Fig. 2. To give the required droop or dip to the front and rear, I impart to the wire as it enters the machine an oscillatory movement, which gives to the flat wire a twist on its passage to the rolls G F. To impart this oscillatory movement to the wire, a wire-guide, e, is arranged in bearings f f, its axis in the plane of the groove in the bending roll or rolls, and it is free for oscillation upon its axis. To this guide e an oscillatory movement is imparted from the shaft I, represented as by a bevel-pinion, g, on the shaft I working into a corresponding pinion, h, on a countershaft, i, extending horizontally from the shaft I. Parallel with the shaft i, but above it, is a second shaft, k, pinions l and m connecting the two shafts, as seen in Figs. 9 and 13. The shaft k carries a crank-wheel, n, in which is a crank-pin, r, and upon this crank-pin one end s of a connecting-rod, t, is hung. This connecting-rod extends toward the guide e, and at its other end is connected to a slide, u, arranged in suitable guides, w, so as to reciprocate in a path at right angles to the axis of the guide e. The upper surface of the slide u carries a toothed rack, 2, which works into a corresponding segment, 3, on the guide e, (see Fig. 18,) and so that as the crank-wheel n revolves it will impart a full reciprocating movement to the slide u at each revolution, and this reciprocating movement of the slide u will impart a corresponding oscillation to the guide e.

From the guide e a bracket, 4, extends upward. Upon this bracket and upon an axis, 5, at right angles to the axis of the guide e, a wheel, 6, is hung so as to revolve in the plane of the axis of the guide e. The periphery of the wheel 6 is grooved corresponding to the wire, and as seen in Fig. 18, and the under side of the periphery of the wheel 6 is in line with the axis of the guide e, as seen in Fig. 18, there being an opening in the upper side of the guide for the wheel 6 to take such position, and as seen in Fig. 11. The wheel 6, being hung upon the guide e, oscillates with it, as indicated in Fig. 18 by the broken lines at the right and left. The wire is run into the guide through its outer end beneath the wheel 6, thence over and around the wheel 6, returning to the under side of the wheel 6, and thence out through the inner end of the guide directly to the bending-rolls, the wire being indicated by the broken line in Fig. 11. Preferably a roller, 7, is introduced into the guide e immediately below the wheel 6, and so as to grasp the wire between the wheel 6 and the roller 7. The wire is held by the wheel 6, and so that as the wheel 6 with the guide oscillates it imparts a twisting action upon the wire as it enters between the rolls G and E and gives the twist to the right or left, as the case may be, to produce the up and down curvature required in the hat frame. The oscillation of the guide is timed according to the positions where the bend is required—that is to say, if the guide and the wheel 6 remain in the vertical position indicated in Fig. 18, they will produce no effect upon the wire passing through the guide; but if they are turned to one side of that plane it follows that the wire will be turned from the plane in which it would otherwise pass through the rolls, and this turning of the wire will give to it the requisite bend in that direction.

The shaft I makes two revolutions during the bending of each frame. Consequently two full reciprocating movements are imparted to the slide u and corresponding oscillatory movments to the guide e during the bending of each frame—that is to say, from the position indicated by the broken line at the right, Fig. 18, to the position indicated by the broken line at the left in the same figure, and return to the right, then to the left, and a second return to the right. The extent to which the guide e and the wheel 6 are thrown to the right or left depends upon the amount of twist necessary to be put into the flat wire to give the required droop to the brim, and that this may be varied according to circumstances I make the crank-pin r adjustable on the crank-wheel n in a common and well-known manner for making adjustable cranks.

If, instead of flat or angular wire, the frames are to be made from round wire, then the wire is run through the guide e, in the same manner before described, and around the wheel 6, and thence to the bending-rolls; but as the wire is round or cylindrical, the oscillation of the guide will impart a corresponding oscillation to the wire, and will therefore guide the wire into the bending-rolls in a corresponding oscillatory manner—that is, it will rotate the wire to the right and left according to the oscillation of the guide e, and so that the action of the bending-rolls, while always radial to the wire, will be changed upon the wire so as to produce a varying radial action. To illustrate: Suppose Fig. 19 to represent a section of the wire enlarged, and that the line 8 represents the vertical plane of the bending-rolls. So long as the rolls bear upon the wire in that plane the bend will simply be in the direction of a flat circle; but if the wire be oscillated—say so as to bring the action of the rolls into the radial line 9—then the bend upon the wire will gradually run from the plane in the line 8 to a plane in the line 9; and so, if turned in the opposite direction to line 10, there will be the same gradual change of the action of the rolls upon the wire until that line, 10, be reached. Consequently while the curve produced in the wire by the bending-rolls will be constant, subject to the variation of the roll R, the oscillation of the wire will produce a lateral bend, according to the extent of oscillation. The result of this is, that the lateral bend required in the wire to produce the droop will be given by oscillating the wire as it runs between the bending-rolls, the downward bend so commencing at a point corresponding to the center of one side of the frame when the wheel 6 is in its vertical position. The oscillation from that point to the extreme left is completed when the center—say at the front—is reached, producing a downward bend, then returning to the vertical position again produces the upward bend from the center front to the center opposite side, then oscillating to the extreme other side produces the downward bend to the center rear, and returning to the vertical position produces the upward bend from the center rear to the place of beginning, where the frame is completed.

The object of applying the wheel 6 to the guide is, that by passing the wire around the wheel, and having the wheel oscillate with the guide, the wire is positively held by the wheel, so as to necessarily produce a corresponding oscillation of the wire. This is more particularly necessary in round wire than in angular wire, yet it is desirable in either case; but in case of round wire it will be difficult to hold the wire so as to produce the oscillation and yet allow it to run free through the guides without the interposition of the wheel 6 or its equivalent.

While I prefer the wheel 6, arranged upon the oscillating guide e and so as to oscillate with it, as a means for supporting the wire and insuring its oscillation with the guide, and to pass the wire inward beneath the wheel, thence over, returning upon the opposite side, and thence out through the inner end of the guide, any suitable circuitous path for the wire through the guide will serve the purpose, (as, for illustration, see Fig. 20, in which I show a section through the guide e;) and in place of the one wheel 6 above the passage through the guide I arrange one wheel, 14, above that passage, and a second wheel, 15, below that passage, the peripheries being respectively in line with the channel and with guide-rolls 16 and 17. The wheels and rolls, it is understood, oscillate with the guide, and so that the wire is run in through the guide, over the roll 17, under the wheel 15, up over the wheel 14, down around the roll 16, thence out through the inner end of the guide to the bending-rolls. This illustration will be sufficient to enable others skilled in the art to produce the circuitous passage for the wire through the guide in various ways, and indicate that this part of the invention is not to be understood as limited to any particular construction of the circuitous passage. I, however, prefer the single wheel 6, as I have described, as producing probably the best results.

The oscillatory movement is derived from the shaft I, as before described. It is necessary that the adjustment of the oscillating guide shall be made in perfect accord with the bending-rolls, which derive their movement from the same shaft, I. To make the oscillating guide adjustable with relation to the shaft I, I make the bevel-pinion g loose on the shaft, and to the shaft I, I apply a sleeve, 11, which is fixed to the shaft and extends toward the pinion g. The adjacent faces of the pinion and of the sleeve 11 are made the one conical and the other the reverse, so that they may set together, as seen in Fig. 20. Then I apply to the shaft a nut, 12, which will bear against the outer end of a sleeve, 13, extending from the pinion g, and so that by turning the nut the pinion will be forced into firm frictional contact with the sleeve 11, and so that the pinion g will be thereby so firmly engaged with the shaft I as to positively partake of its rotation; but at any time it is desirable, by simply loosening the nut 12 to relieve the frictional contact between the pinion g and the sleeve on the shaft, the pinion may be rotated, imparting its rotation to the wire-guide, and so that the relative position of the guide to the shaft may be thereby changed, and when the required position is attained the engagement of the pinion with the shaft is again made. This device affords an easy means of adjustment, and one which may be made with most perfect accuracy.

I prefer to make the stationary frictional bearing upon the shaft in the form of a sleeve, 11, as I have described; but it will be understood that any collar upon the shaft presenting a face to frictionally engage the corresponding face of the pinion g may be substituted therefor, and to this end the sleeve 11 may be considered as an integral part of the shaft, and the bearing-surface made by a reduction in the diameter of the shaft to correspond to the internal diameter of the pinion $g$.

After the wire has been bent, as I have described, to produce the complete frame, it is cut off, and so that each piece cut will make a complete frame, and all succeeding frames will be of the same size, the size varying only by a readjustment of the machine. The wires, however, may be cut to length and introduced to the machine, so that the cutting device may be omitted.

In the illustration of my invention I have shown the same cutting mechanism as that of the patent before referred to; but as it does not enter into the present invention, I have not deemed it necessary to describe it.

I claim—

1. In a machine for bending hat-wires, the combination of the bending-rolls and an oscillating guide through which the wire is led to the bending-rolls, the axis of said guide being substantially in line between the principal rolls, the said guide constructed with a circuitous passage through which the wire runs to the bending-rolls, substantially as described, whereby the wire passing through the guide is forced to partake of the oscillating movement of the guide.

2. In a machine for bending hat-wires, the combination of the bending-rolls, the oscillating guide $e$, through which the wire is led to the bending-rolls, and a wheel, 6, hung upon said oscillating guide so as to oscillate therewith, the axis of the said wheel being at substantially right angles to the axis of the said guide, so that the wire in running through the said guide passes around the said wheel, substantially as and for the purpose described.

3. In a machine for bending hat-wires, the combination of the rolls E G and the adjustable roll R with a wire-guide, $e$, arranged in bearings upon an axis substantially in line between the two rolls E G, and with a circuitous passage through said guide, through which the wire may run to the said rolls E G, a reciprocating toothed slide, $u$, and corresponding segment on the said guide $e$, substantially as described, whereby an oscillating movement is imparted to said guide and to the wire running through it.

4. The combination of the bending-rolls G E, the lever S, hung loose upon the axis of the roll E, the said lever provided with a second part, S', hung upon the same axis, the roll R, hung upon the said part S' of said lever and in the plane of the rolls G E, an eccentric, T, adapted to operate upon said lever S and impart vibration thereto, and an adjusting-screw between the said parts S and S' of said lever, substantially as described, whereby the said part S' and the roll it carries are made adjustable independent of the lever S.

5. In a machine for bending hat-wires, the combination of a pair of rolls through which the wire passes to be bent, the shaft I, through which one of said rolls receives its revolution, an oscillating guide through which the wire is delivered to said rolls, a pinion, $g$, loose on said shaft I, but from which movement is communicated to said oscillating guide, the said shaft and the said pinions provided, the one with a conical annular surface and the other with the reverse-shaped surface, the one adapted to engage the other, and a nut upon said shaft adapted to force the said pinion into engagement with the said annular surface on the shaft or release it therefrom, substantially as and for the purpose described.

JOSEPH NUTT.

Witnesses:
JOHN A. OLMSTEAD,
JOSEPH M. IVES.